United States Patent [19]

Gross, Sr.

[11] Patent Number: 4,985,997

[45] Date of Patent: Jan. 22, 1991

[54] CHAIN SAW ATTACHMENT

[76] Inventor: Donald S. Gross, Sr., 24462 Eucalyptus, Moreno Valley, Calif. 92388

[21] Appl. No.: 497,740

[22] Filed: Mar. 19, 1990

Related U.S. Application Data

[63] Continuation of Ser. 305,073, Feb. 2, 1989, abandoned.

[51] Int. Cl.[5] .............. B23D 45/16

[52] U.S. Cl. .............. 30/122; 30/123; 30/382; 30/390

[58] Field of Search .............. 30/122, 123, 371, 381, 30/382, 383, 384, 385, 388, 389, 390; 144/208 J, 1 F, 1 E; 125/13 R; 51/170 PT, 170 T

[56] References Cited

U.S. PATENT DOCUMENTS

| | | | |
|---|---|---|---|
| 2,810,409 | 10/1957 | Ibelle et al. | 143/43 |
| 4,033,035 | 7/1977 | Trimmer | 30/122 |
| 4,121,336 | 10/1978 | Loyd | 30/122 |
| 4,160,319 | 7/1979 | Caruso | 30/122 |
| 4,270,270 | 6/1981 | Loyd | 30/122 |
| 4,321,838 | 3/1982 | Feldman | 30/122 X |
| 4,441,534 | 4/1984 | Wilson | 30/122 X |
| 4,479,303 | 10/1984 | Gardner | 30/122 X |
| 4,506,444 | 3/1985 | Sundstrom | 30/122 |
| 4,615,117 | 10/1986 | Flath | 30/122 |
| 4,649,644 | 3/1987 | Huddleston | 30/122 |
| 4,674,185 | 6/1987 | Gardner | 30/122 |
| 4,809,438 | 3/1989 | Nagashima et al. | 30/122 X |

*Primary Examiner*—Hien H. Phan
*Assistant Examiner*—Rinaldi Rada
*Attorney, Agent, or Firm*—Harvey S. Hertz

[57] ABSTRACT

A chain saw attachment for driving a circular blade from a chain saw includes a chain mounted on a chain guide and driven by the chain saw motor. A sprocket is mounted at one end of the chain guide and is rotatable with the chain. A spindle is secured to the sprocket and is rotatble therewith. At least one housing member surrounds the sprocket spindle and has a flange section attached to the chain guide. The circular blade is connected to the sprocket spindle for enabling the circular blade to rotate with the spindle.

1 Claim, 2 Drawing Sheets

CHAIN SAW ATTACHMENT

This is a continuation of copending application Ser. No. 07/305,073 filed on Feb. 2, 1989, now abandoned.

BACKGROUND OF THE INVENTION

1. Field of the Invention

The invention relates in general to chain saw attachments, and, more particularly, to a circular blade which is driven by a chain saw and is secured to the chain saw with only minor modifications.

2. Description of the Prior Art

The use of a saw drive mechanism to drive one form of blade from another is well known. For example, in U.S. Pat. No. 4,506,444, a chain saw drive is utilized to provide rotary motion output to an auxiliary tool mounted at one end of the chain saw. This arrangement is rather complex and requires a substantial modification of the chain saw.

U.S. Pat. No. 2,810,409, also provides a rotary output using the motor drive of a chain saw. U.S. Pat. Nos. 4,033,035; 4,649,644 and 4,121,336 all utilized circular saws whose output is used to drive a chain saw. Other known prior art includes U.S. Pat. Nos. 4,674,185 and 4,160,319.

The present invention modifies a conventional chain saw so that a circular blade member can be driven by the saw chain of a conventional chain saw with only minor modifications.

SUMMARY OF THE INVENTION

A chain saw attachment for driving a circular blade from a saw chain includes a chain mounted on a chain drive and driven by a chain saw motor. A sprocket is mounted at one end of the chain guide and is rotatable with the chain. A spindle is secured to the chain sprocket and is rotatable therewith. At least one housing member surrounds the sprocket spindle and has a flange section attached to the chain guide. The circular blade is connected to the sprocket spindle for enabling the blade to rotate with the spindle.

The advantages of this invention, both as to its construction and mode of operation, will be readily appreciated as the same becomes better understood by reference to the following detailed description, when considered with the accompanying drawings, in which like referenced numerals designated like parts throughout the figures.

DESCRIPTION OF THE PREFERRED EMBODIMENT

Figure 1:
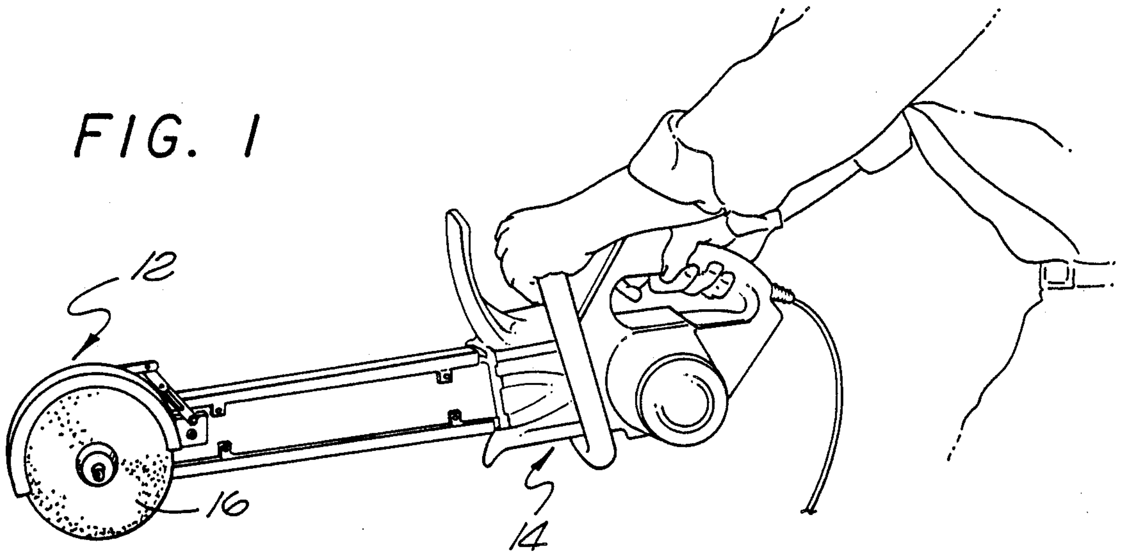
FIG. 1 is a perspective view of a chain saw having a chain saw attachment connected thereto.

Referring now to the drawings there is shown in FIG. 1, a chain saw attachment 12 constructed in accordance with principles of the invention. The attachment is secured to the free end of a conventional chain saw 14. As illustrated in FIG. 1, the chain saw 14 is utilized to drive a circular blade or wheel 16 connected to the chain saw attachment 12.

Figure 2:
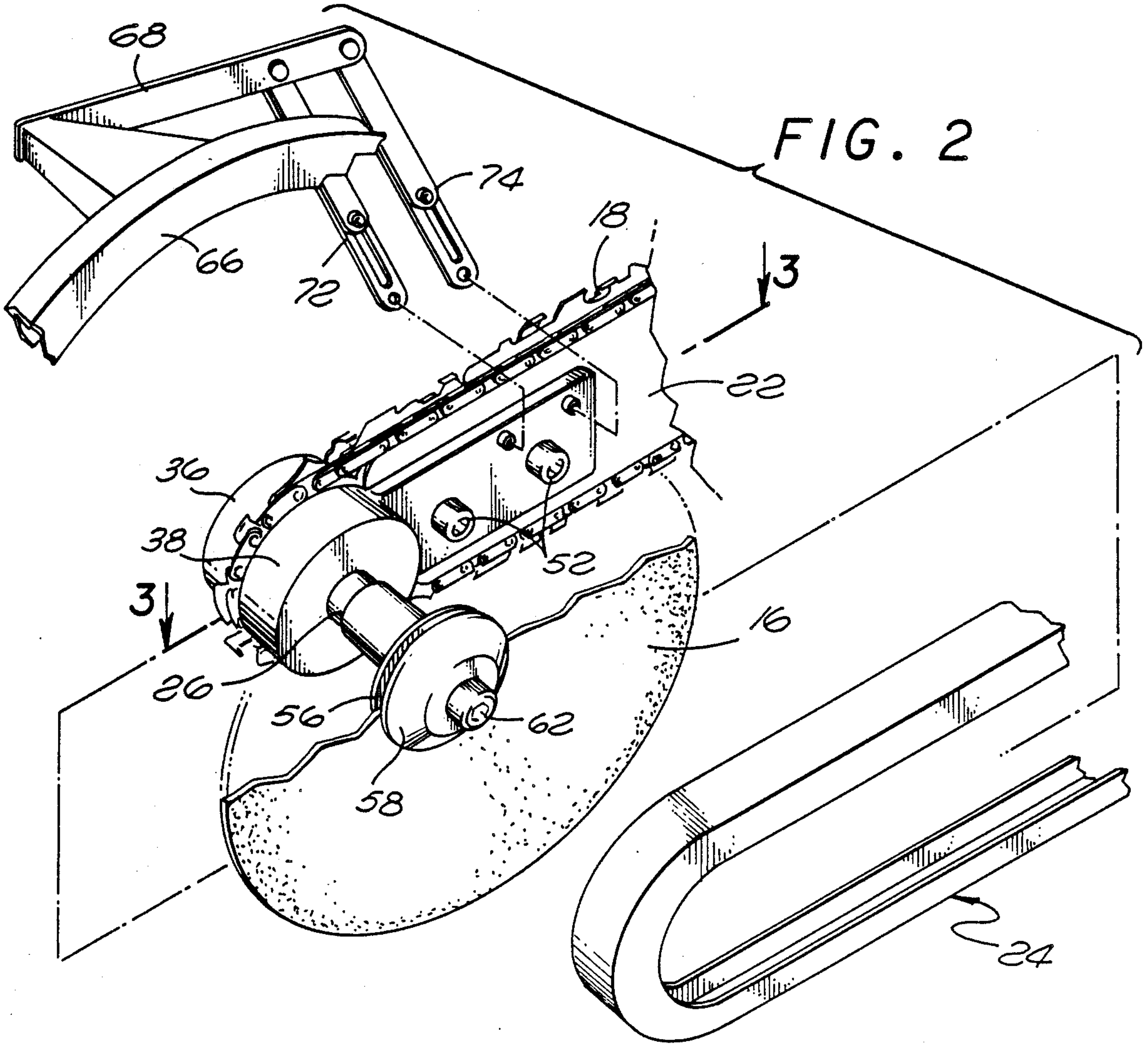
FIG. 2 is an exploded view of the chain saw attachment secured to the device of FIG. 1.

As illustrated in FIG. 2, the chain saw attachment 12 is shown in greater detail and includes a conventional saw chain 18 which moves around the outer edge of a chain guide 22. The saw chain 18 can have its cutting edge removed as the tool work is performed by the circular blade 16 and not the saw chain. Therefore, an optional chain guard 24 may not be necessary. The saw chain 18 is used to drive a spindle 26 having the circular blade 16 secured thereto as will be explained in greater detail in FIGS. 3 and 4.

Figure 3:
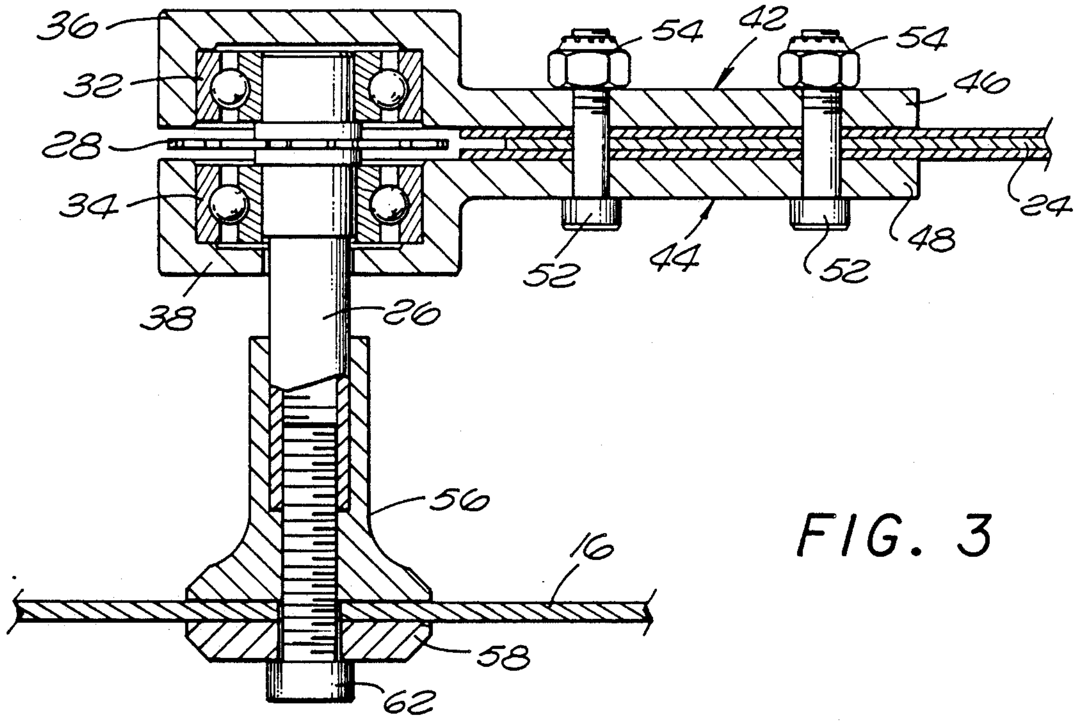
FIG. 3 is a cross-sectional view of the chain saw attachment taken along the line 3—3 of FIG. 2.
Figure 4:
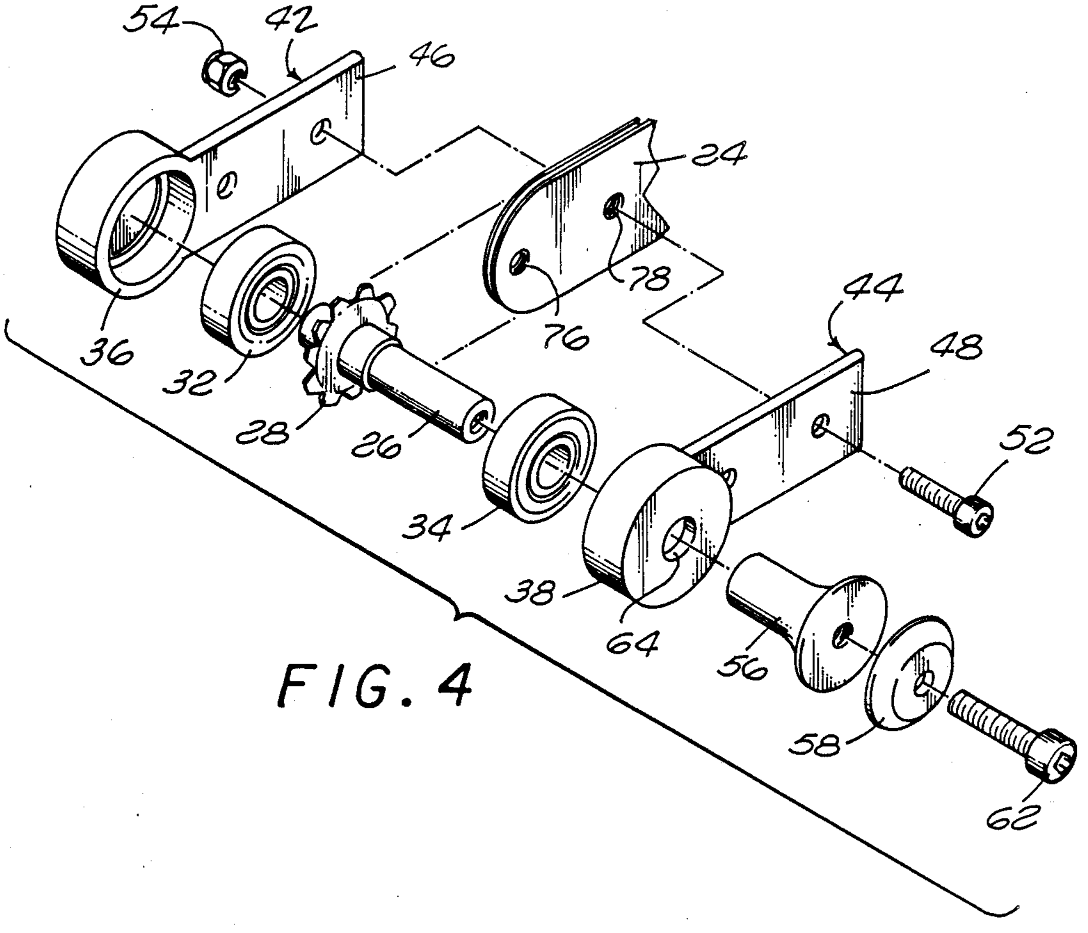
FIG. 4 is an exploded perspective view of the chain saw attachment of FIG. 3.

Referring now to FIGS. 3 and 4, the spindle 26 contains a sprocket 28 mounted thereon which rotates therewith. The sprocket 28 meshes with the saw chain 18 (not shown in FIGS. 3 and 4) thus causing the sprocket spindle 26 to rotate. Mounted on the spindle 26, on opposite sides of the sprocket 28, are a pair of bearings 32 and 34, respectively. Each bearing 32 and 34, is positioned in the cup-shaped portion 36 and 38, respectively, of housings 42 and 44. The housings 42 and 44 each have an integral flange 46 and 48, respectively, which extend in a plane perpendicular to the axis of the spindle 26.

As illustrated in FIG. 3, once the bearings 32 and 34 are mounted in their respective housing sections, the flanges 46 and 48 are secured together on opposite sides of the chain guide 24 by means of a pair of bolts 52 and nuts 54, the nuts 54 extending through the flanges as well as the chain guide. The circular blade 16 is secured between a bushing 56 and a backup washer 58 by means of a threaded bolt 62 which extends through the washer 58 and the bushing 56 and is secured to the spindle 26 as illustrated in FIG. 3.

It should be noted that the only difference between the housing 44 and the housing 42 is a central opening 64 formed in the cup shaped portion 38 of the housing 44. Thus, the entire device is reversible so that the blade 16 can, if desired, be placed on either side of the chain guide 22 merely by reversing all of the parts of the attachment, thus enabling the blade 16 to cut close to a wall should it be necessary or desirable.

Referring again to FIG. 2, an optional adjustable blade guard is illustrated and comprises a blade cover 66 which is secured to a mounting bracket 68. A pair of telescopically adjustable mounting rods 72 and 74 are secured between the mounting bracket 68 and the chain guide 22. The telescoping arrangement of the mounting rods 72 and 74 enable the blade cover 66 to be used with different diameter circular blades 16.

It should be noted that the present invention enables a circular blade to be driven by a chain saw with only minor modifications to a conventional chain saw. These modifications include drilling a pair of openings 76 and 78 in the chain guide 24, enabling the bolts 52 to pass therethrough for securing the housing members 42 and 44 to the chain guide. The only other modification is to that the chain 18 which must be extended so that its length is sufficient to traverse the sprocket 28.

I claim:

1. A chain saw attachment for driving a circular member from a saw chain comprising:
   - a chain mounted on a chain guide an driven by a chain saw motor;
   - a sprocket mounted at one end of said chain guide and rotatable with said chain:
   - a spindle secured to said sprocket and rotatable therewith, said sprocket spindle having a pair of bearings mounted thereon, each bearing mounted on an opposite side of said sprocket;

means for mounting said circular member on either side of said chain guide comprising a pair of identically shaped housing members each surrounding said sprocket spindle, at least one of said housing members having a central opening for enabling said spindle to pass therethrough and each having an integrally formed flanged section attached to the chain guide, each housing member having a cup-shaped recess for enabling said bearings to be inserted therein, each of said housing members being reversibly positioned on either side of said chain guide, each of said flange sections extending from said cup-shaped recesses toward said chain guide; and means for connecting said circular member to said sprocket spindle for enabling said member to rotate with said spindle.

* * * * *